(12) United States Patent
Wang

(10) Patent No.: US 9,985,670 B2
(45) Date of Patent: May 29, 2018

(54) WIRELESS COMMUNICATION DEVICE AND POWER MEASUREMENT DEVICE EQUIPPED WITH THE SAME

(71) Applicant: Renesas Electronics Corporation, Tokyo (JP)

(72) Inventor: Ningyi Wang, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days. days.

(21) Appl. No.: 15/498,276

(22) Filed: Apr. 26, 2017

(65) Prior Publication Data

US 2018/0013457 A1 Jan. 11, 2018

(30) Foreign Application Priority Data

Jul. 8, 2016 (JP) .................................. 2016-135769

(51) Int. Cl.
*H04B 1/10* (2006.01)
*H02M 3/04* (2006.01)

(52) U.S. Cl.
CPC ............ *H04B 1/1018* (2013.01); *H02M 3/04* (2013.01)

(58) Field of Classification Search
CPC ............................... H04B 1/1018; H04M 3/04
USPC ........................................................ 455/298
See application file for complete search history.

(56) References Cited

U.S. PATENT DOCUMENTS

| | | | | |
|---|---|---|---|---|
| 7,990,220 B2* | 8/2011 | Kondo | ................. | H03F 1/0272 330/276 |
| 8,099,062 B1* | 1/2012 | Terrovitis | ................. | H04B 1/48 455/73 |
| 2009/0261901 A1* | 10/2009 | Meharry | ................. | H03F 3/602 330/124 R |
| 2013/0057343 A1* | 3/2013 | Kondo | ................. | H03F 1/0277 330/252 |
| 2014/0087673 A1* | 3/2014 | Mostov | ................. | H03F 1/0227 455/78 |
| 2017/0070197 A1* | 3/2017 | Sivonen | ................. | H03F 3/265 |

FOREIGN PATENT DOCUMENTS

JP 2000-286385 A 10/2000

* cited by examiner

*Primary Examiner* — Sanh Phu
(74) *Attorney, Agent, or Firm* — McGinn IP Law Group, PLLC

(57) ABSTRACT

The present invention provides a wireless communication device that can receive a high frequency signal with a high sensitivity by reducing the noise received from a DC-DC converter, as well as a power measurement device equipped with such a wireless communication device. According to an embodiment, a wireless communication device includes: a switching-type DC-DC converter; a balun configured with a coil to output a differential signal based on a wirelessly received high frequency signal; a low noise amplifier driven by an output voltage of the DC-DC converter to process the differential signal output from the balun; and a ground voltage line that couples the low noise amplifier to a ground voltage source. The ground voltage line includes partial ground voltage lines that are arranged to face each other with the balun interposed therebetween.

19 Claims, 13 Drawing Sheets

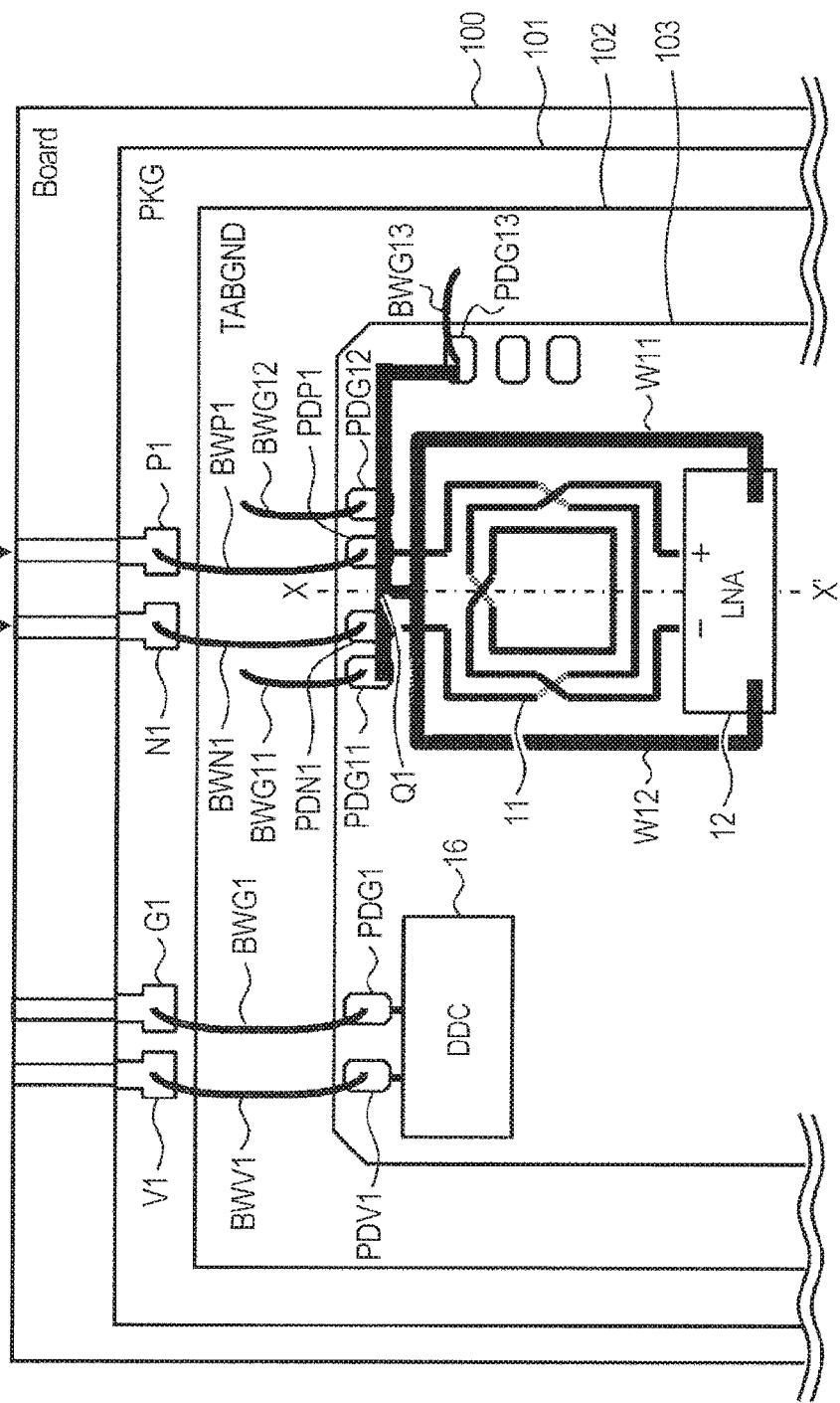
FIG. 2
SYS1
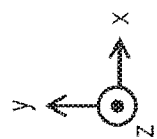

FIG. 8
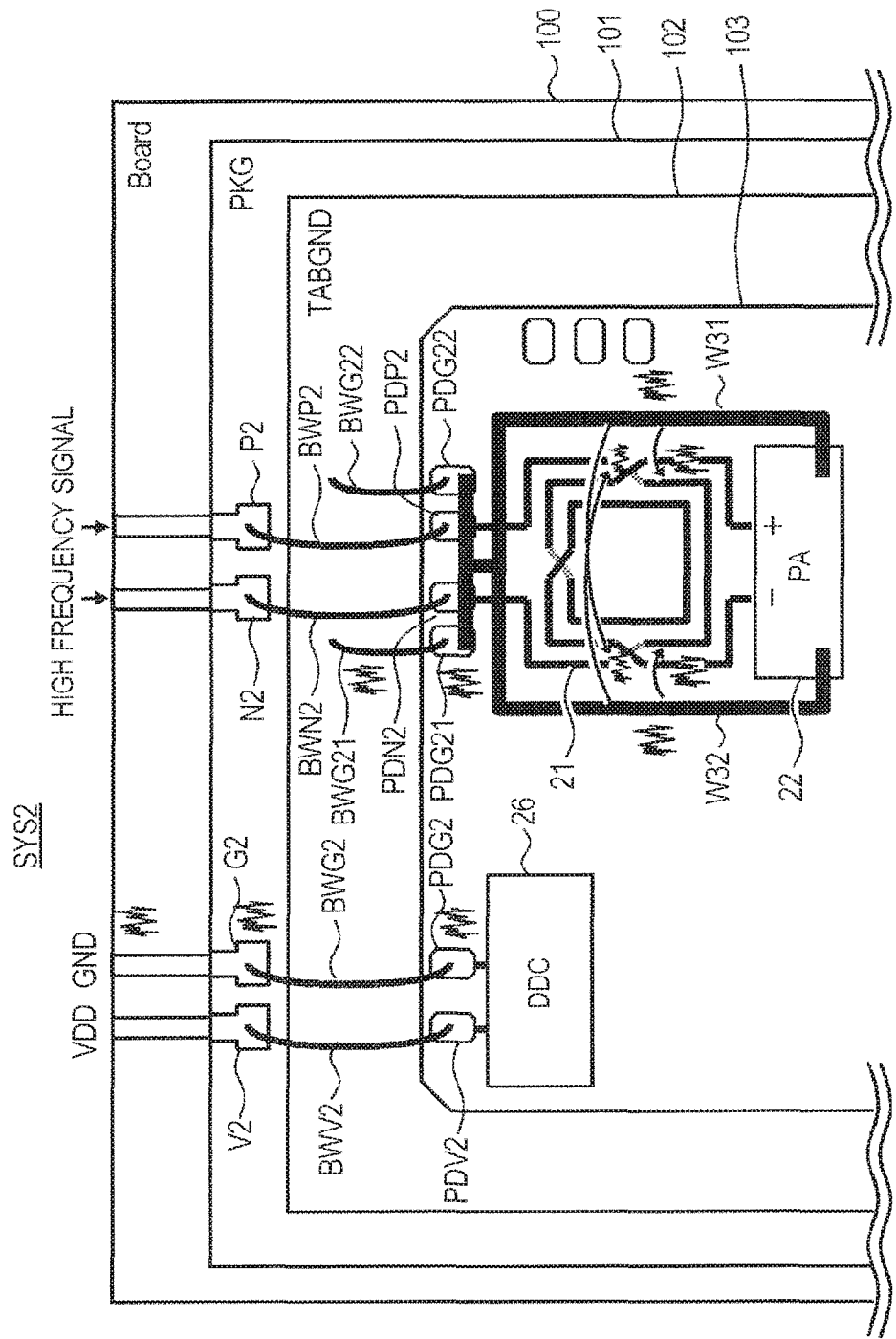
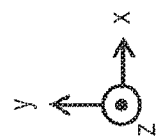

WIRELESS COMMUNICATION DEVICE AND POWER MEASUREMENT DEVICE EQUIPPED WITH THE SAME

CROSS-REFERENCE TO RELATED APPLICATIONS

The disclosure of Japanese Patent Application No. 2016-135769 filed on Jul. 8, 2016 including the specification, drawings and abstract is incorporated herein by reference in its entirety.

BACKGROUND

The present invention relates to a wireless communication device and a power measurement device equipped with the same. For example, the present invention relates to a wireless communication device suitable for receiving a high frequency signal with a high sensitivity, and a power measurement device equipped with such a wireless communication device.

The wireless communication device includes a voltage generation unit that generates voltage supplied to each functional block. In recent years, LDO regulator has been replaced by a DC-DC converter as a voltage generation unit in order to reduce power consumption and external component cost. However, when the DC-DC converter is provided in the wireless communication device, a harmonic component (noise) generated due to the switching operation of the DC-DC converter is propagated to a balun whose function is to output a differential signal based on a wirelessly received high frequency signal, through a ground voltage line. As a result, there has been a problem that the reception sensitivity of the high frequency signal is degraded at a specific frequency of the wireless communication device.

For example, Patent Document 1 (Japanese Unexamined Patent Application Publication No. 2000-286385) discloses the configuration of a semiconductor integrated circuit in which a shield metal layer fixed at the grand level is laminated between a semiconductor substrate and a signal wiring layer. This configuration prevents the propagation of noise from the semiconductor substrate to the signal wiring layer.

SUMMARY

When the shield metal layer described above is applied to a wireless communication device equipped with a DC-DC converter, a harmonic component (noise) generated due to the switching operation of the DC-DC converter is propagated to the shield metal layer fixed at the ground level through the ground voltage line, which is then propagated to the balun. In other words, the shield metal layer may not prevent the harmonic component generated due to the switching operation of the DC-DC converter from being propagated to the balun. As a result, there has been a problem that the reception sensitivity of the high frequency signal is degraded at a specific frequency of the wireless communication device. These and other objects and novel features of the present invention will become apparent from the specification and the accompanying drawings.

According to an embodiment, a wireless communication device is configured with a switching-type DC-DC converter and a coil. The wireless communication device includes: a balun that outputs a differential signal based on a wirelessly received high frequency signal; an internal circuit that is driven by an output voltage of the DC-DC converter to process the differential signal output from the balun; and a ground voltage line that couples the internal circuit to a ground voltage source. The ground voltage line includes a first partial ground voltage line, as well as a second partial ground voltage line arranged to face the first partial ground voltage line with the balun interposed therebetween.

According to another embodiment, a wireless communication device is configured with a switching-type DC-DC converter, an internal circuit that is driven by an output voltage of the DC-DC converter to output a differential signal, and a coil. The wireless communication device includes a balun that outputs a high frequency signal based on a differential signal, and a ground voltage line that couples the internal circuit to a ground voltage source. The ground voltage line has a first partial ground voltage line, as well as a second partial voltage line arranged to face the first partial ground voltage line with the balun interposed therebetween.

According to the above described one embodiment, it is possible to provide a wireless communication device that can receive a high frequency signal with a high sensitivity by reducing the noise received from the DC-DC converter, as well as a power measurement device equipped with such a wireless communication device.

BRIEF DESCRIPTION OF THE DRAWINGS

FIG. 2 is a schematic plan view of the wireless communication system according to the first embodiment;

FIG. 8 is a schematic plan view showing the propagation of noise from the DC-DC converter to the balun in the wireless communication system shown in FIG. 7;

DETAILED DESCRIPTION

Figure 1:
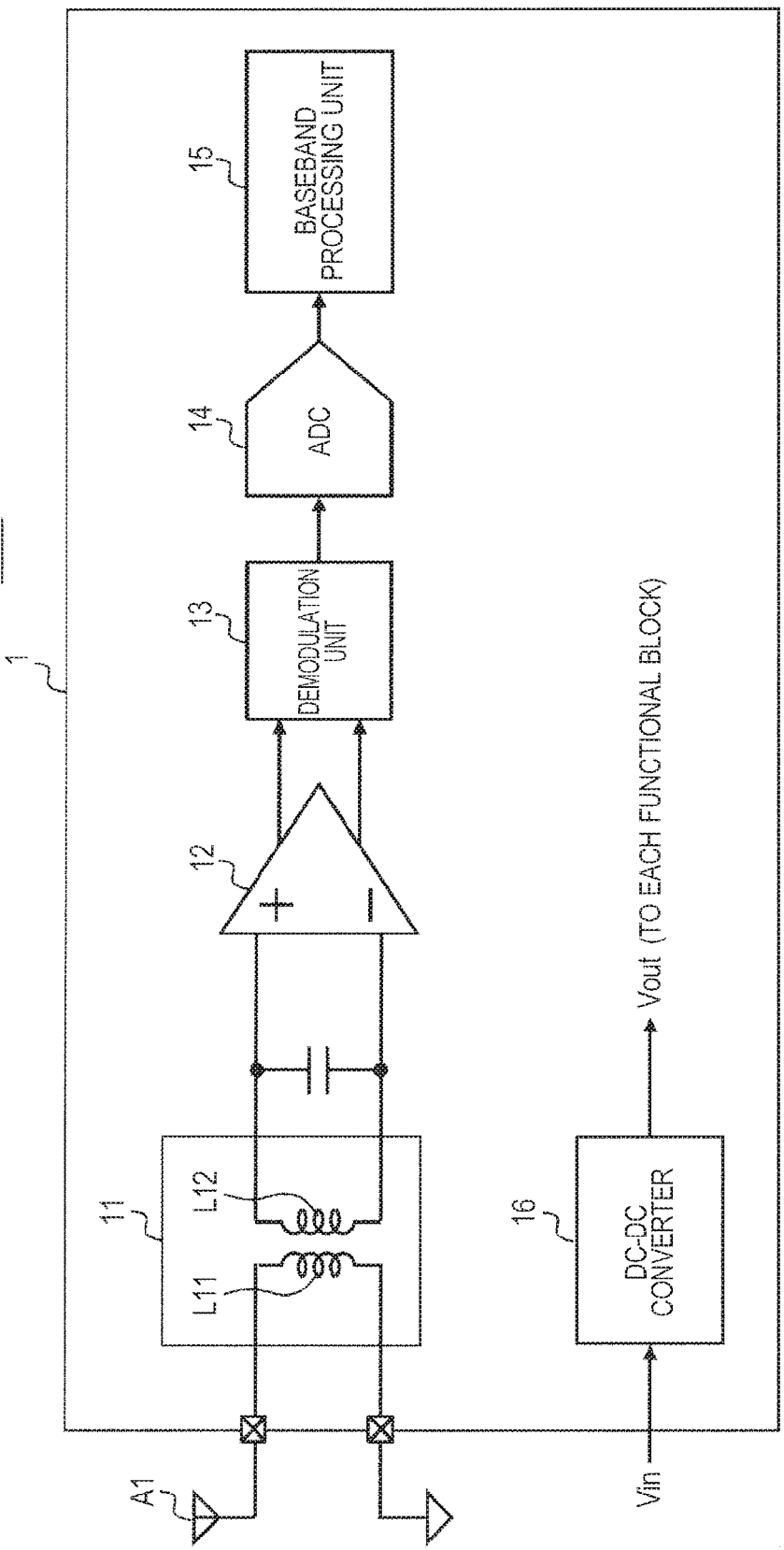
FIG. 1 is a block diagram showing a configuration example of a wireless communication system according to a first embodiment.

Hereinafter, preferred embodiments of the present invention will be described with reference to the accompanying drawings. Note that the drawings are simplified, so that the technical scope of the embodiments should not be construed narrowly on the basis of these drawings. Further, the same parts are designated by the same reference numerals, and the repetitive description thereof will be omitted.

In the embodiment described below, the detailed description of the invention will be divided into a plurality of sections or embodiments when required as a matter of convenience. However, these sections or embodiments are not irrelevant to each other unless otherwise stated, and one serves as a variation, a detailed description, or a supplementary explanation of a part or the whole of the other. Also, in the embodiment described below, when referring to the number of elements (including the number of pieces, numerical value, amount, range, etc.), the number of elements is not limited to a specific number unless otherwise stated or it is clearly limited to a specific number in principle. The number of elements can be greater or smaller than the specific number.

Further, in the embodiment described below, the components (including operation steps, etc.) are not necessarily indispensable, unless otherwise stated or unless it is considered to be clearly indispensable in principle. Similarly, in the embodiment described below, when referring to the shape, the positional relationship, or other characteristics of the components, those practically approximating or corresponding to the shape or other characteristics are included unless otherwise stated or unless they are clearly considered not to be so in principle. This is true for the number or other attributes (including the number of pieces, numerical value, amount, range, etc.).

First Embodiment

FIG. 1 is a block diagram showing a configuration example of a wireless communication system SYS1 according to a first embodiment. The wireless communication system SYS1 is applied, for example, to power measurement devices such as a smart meter, mobile phones, or car navigation systems. In the wireless communication system SYS1 according to the present embodiment, not only a balun and a low noise amplifier but also a DC-DC converter is mounted on a semiconductor chip that configures the wireless communication system. Further, a ground voltage line that couples the low noise amplifier to a ground voltage source is branched into first and second partial ground voltage lines. The first and second partial ground voltage lines are arranged to face each other with the balun interposed therebetween. With this configuration, the wireless communication system SYS1 according to the present embodiment can make the magnitudes of the noises received at one output terminal of the balun and the other output terminal thereof from the DC-DC converter approximately equal to each other. Thus, it is possible to reduce the degradation of the reception sensitivity of the high frequency signal at a specific frequency. A detailed description is given below.

As shown in FIG. 1, the wireless communication system SYS1 includes at least a wireless communication device (semiconductor device) 1 and an antenna A1. For example, the wireless communication device 1 is formed on a single semiconductor chip, including a balun 11, a low noise amplifier (an internal circuit) 12, a demodulation unit 13, an AD converter 14, a baseband processing unit 15, and a DC-DC converter 16. Note that the example of FIG. 1 shows a circuit of the reception path provided in the wireless communication device 1 but, of course, the circuit of the transmission path can be provided in the wireless communication device 1.

The balun 11 converts a single-ended high frequency signal, which is wirelessly received from outside through the antenna A1, into a differential high frequency signal (differential signal). Note that the balun 11 not only converts the single-ended high frequency signal into a differential high frequency signal, but also outputs a differential high frequency signal by transmitting the differential high frequency signal in some cases. Hereinafter, only the former case will be described as a representative example.

More specifically, the balun 11 includes a primary coil L11 and a secondary coil L12. One end of the primary coil L11 is coupled to the antenna A1, and the other end of the primary coil L11 is coupled to a ground voltage terminal GND. One end of the secondary coil L12 is coupled to a non-inverting input terminal (P-side terminal) of the low noise amplifier 12, and the other end of the secondary coil L12 is coupled to an inverting input terminal (N-side terminal) of the low noise amplifier 12.

For example, when the wirelessly received high frequency signal has a positive amplitude, the current flows from one end to the other end of the primary coil L11. Then, a positive electromotive force is generated in the secondary coil L12, according to the change in the current of the primary coil L11. On the other hand, when the wirelessly received high frequency signal has a negative amplitude, the current flows from the other end to one end of the primary coil L11. Then, a negative electromotive force is generated in the secondary coil L12, according to the change in the current of the primary coil L11. As a result, a negative amplitude AC signal is generated at one end of the secondary coil L12 and a positive amplitude AC signal is generated at the other end of the secondary coil L12. In other words, differential high frequency signals are output from one end to the other end of the secondary coil L12.

Note that the configuration of the balun 11 is not limited to the configuration described above, and can be appropriately changed to other configurations having an equivalent function. For example, the balun 11 can not only convert between balance and imbalance of electrical signals but also have a function as a matching circuit that performs impedance matching.

The low noise amplitude 12 amplifies the differential high frequency signal output from the balun 11 with low noise. Note that the low noise amplifier 12 may not be provided if it is not necessary to amplify the high frequency signal. The demodulation unit 13 demodulates the differential high frequency signal, which is amplified by the low noise amplifier 12, into a baseband signal. The AD converter 13 converts the analog baseband signal into a digital baseband signal. The baseband processing unit 15 performs a predetermined process based on the digital baseband signal.

The DC-DC converter 16 has a switching-type circuit configuration. The DC-DC converter 16 performs a switching operation synchronously with a clock signal CLK (not shown) to generate an output voltage Vout by stepping up or down an input voltage Vin that is supplied from a power source (not shown). The output voltage Vout is supplied to each of the functional blocks (the low noise amplifier 12, the demodulation unit 13, the AD converter 14, the baseband processing unit 14, and the like) that are provided in the wireless communication device 1.

In this way, the wireless communication system SYS1 drives the respective functional blocks by using the output voltage Vout from the DC-DC converter 16, thus causing current to be intermittently supplied from the power source. As a result, the increase in power consumption can be suppressed.

Next, the planar structure of the wireless communication system SYS1 is described.

(Preliminary Study by the Inventors)

Before giving a detailed description of the planar structure of the wireless communication system SYS1, the planar structure of a wireless communication system SYS50 that the inventors have previously studied is first described with reference to FIG. 9.

Figure 9:
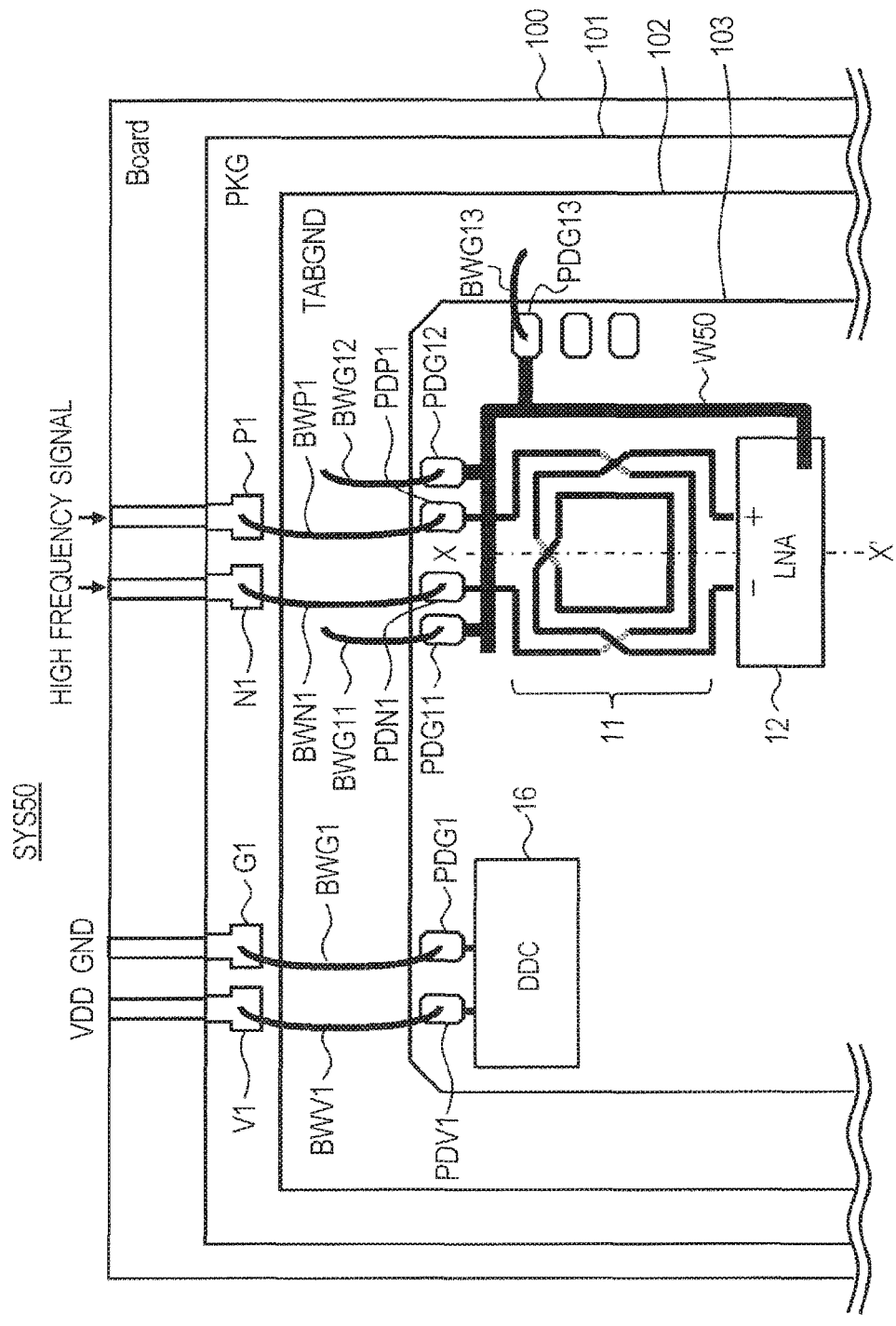
FIG. 9 is a schematic plan view of the wireless communication system according to the idea before reaching the first embodiment.

FIG. 9 is a schematic plan view of the wireless communication system SYS50 according to the idea before reaching the first embodiment. As shown in FIG. 9, in the wireless communication system SYS50, a semiconductor package 101 (corresponding to the wireless communication device) is formed on a board 100. A tab ground 102, which is a common ground voltage area, is formed within the semiconductor package 101. Then, a semiconductor chip 103 is formed on the tab ground 102. Note that the tab ground 102 is coupled to the ground voltage source GND through the board 100.

A plurality of functional blocks and a plurality of pads are arranged on the semiconductor chip 103. In the example of FIG. 9, of the functional blocks, only the balun 11, the low noise amplifier 12, and the DC-DC converter 16 are shown, and similarly of the pads, only pads PDV1, PDG1, PDGs 11 to 13, PDP1, and PDN1 are shown.

The pads are arranged along the outer periphery on the semiconductor chip 103. The balun 11 is provided as close to the outer periphery as possible on the semiconductor chip 103. In this way, the balun 11 can receive high frequency signals from outside with a high sensitivity.

As described above, the balun 11 is configured with the primary coil L11 and the secondary coil L12. In the example of FIG. 9, the primary coil L11 and the secondary coil L12 are arranged in a whorl-like pattern in such a way that their outer periphery is rectangular in the same wiring layer (however, in different wiring layers at the intersection). Further, in the example of FIG. 9, the primary coil L11 and the secondary coil L12 are arranged symmetrically with respect to the X-X' axis as the symmetry axis.

One end of the primary coil L11 is coupled to the pad PDP1, and the other end of the primary coil L11 is coupled to the pad PDN1. The pad PDP1 is coupled to an external connection terminal P1 of the semiconductor package 101 through a bonding wire BWP1. The external connection terminal P1 is coupled to the antenna A1 through the board 100. The pad PDN1 is coupled to an external connection terminal N1 of the semiconductor package 101 through the bonding wire BWN1. Then, the external connection terminal N1 is coupled to the ground voltage source GND through the board 100.

One end of the secondary coil L12 is coupled to the non-inverting input terminal (P-side terminal) of the low noise amplifier 12, and the other end of the secondary coil L12 is coupled to the inverting input terminal (N-side terminal) of the low noise amplifier 12.

Further, a ground voltage line W50 is provided on the semiconductor chip 103 to couple the low noise amplifier 12 and the ground voltage source GND. More specifically, the ground voltage line W50 is arranged to extend from the voltage terminal on the low potential side towards the pads PDG11 to PDG13 through the wiring area between the balun 11 and the outer periphery of the semiconductor chip 103.

The pads PDG11 to PDG13 are coupled to the tab ground 102 which is the common ground voltage area within the semiconductor package, respectively, through the bonding wires BWG11 to BWG13.

The voltage terminal on the high potential side of the DC-DC converter 16 is coupled to the pad PDV1, and the voltage terminal on the low potential side of the DC-DC converter 16 is coupled to the pad PDG1. The pad PDV1 is coupled to an external connection terminal V1 of the semiconductor package 101 through the bonding wire BWV1. The external connection terminal V1 is coupled to a power supply voltage source VDD through the board 100. The pad PDG1 is coupled to an external connection terminal G1 of the semiconductor package 101 through the bonding wire BWG1. Then, the external connection terminal G1 is coupled to the ground voltage source GND through the board 100.

Here, in the wireless communication system SYS50, a harmonic component (noise), which is generated due to the switching operation of the DC-DC converter 16, is propagated to the balun 11 through the ground voltage line W50. This leads to a problem that the reception sensitivity of the high frequency signal at a specific frequency is degraded in the wireless communication system SYS50.

The mechanism that the reception sensitivity of the high frequency signal is degraded at a specific frequency of the wireless communication system SYS50 will be describe in detail below.

Figure 10:
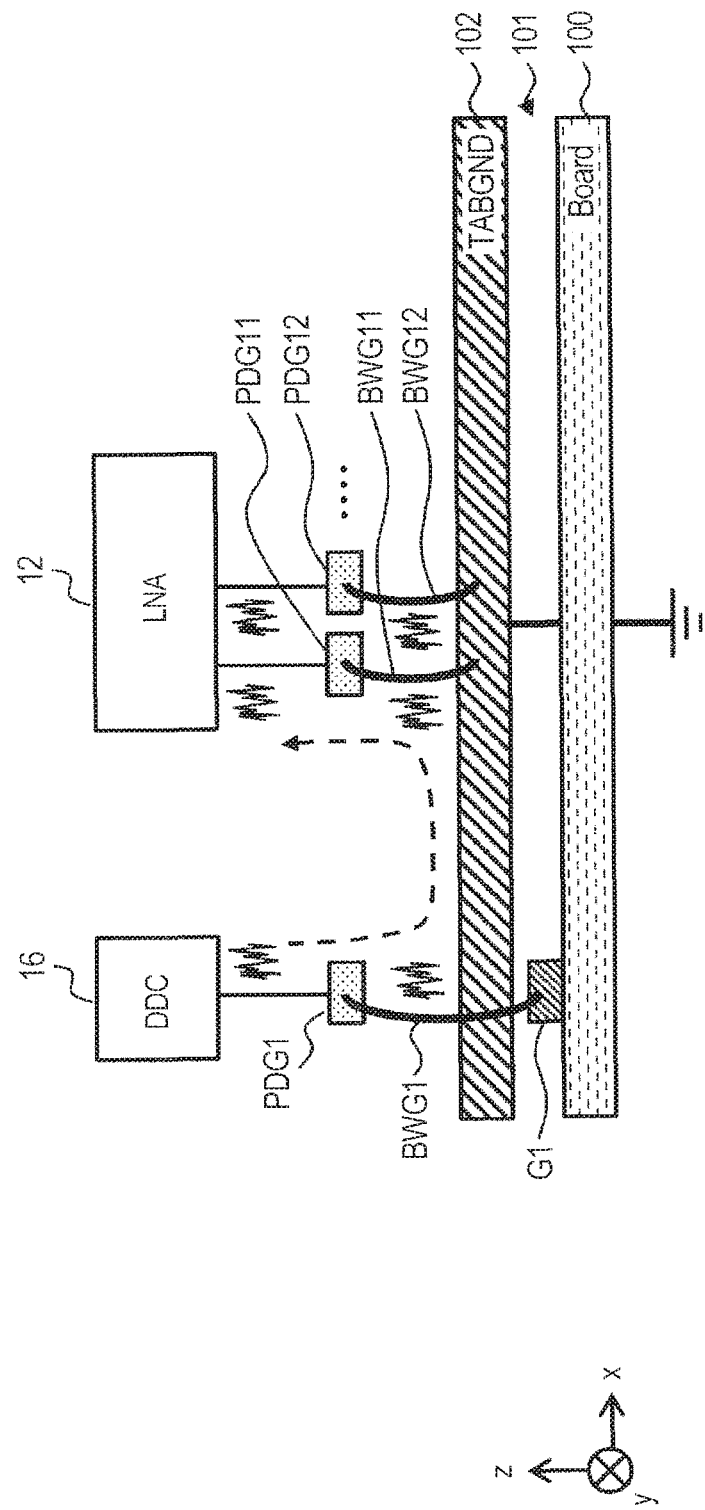
FIG. 10 is a schematic cross-sectional view showing the propagation of noise from the DC-DC converter to a low noise amplifier in the wireless communication system shown in FIG. 9.
Figure 11:
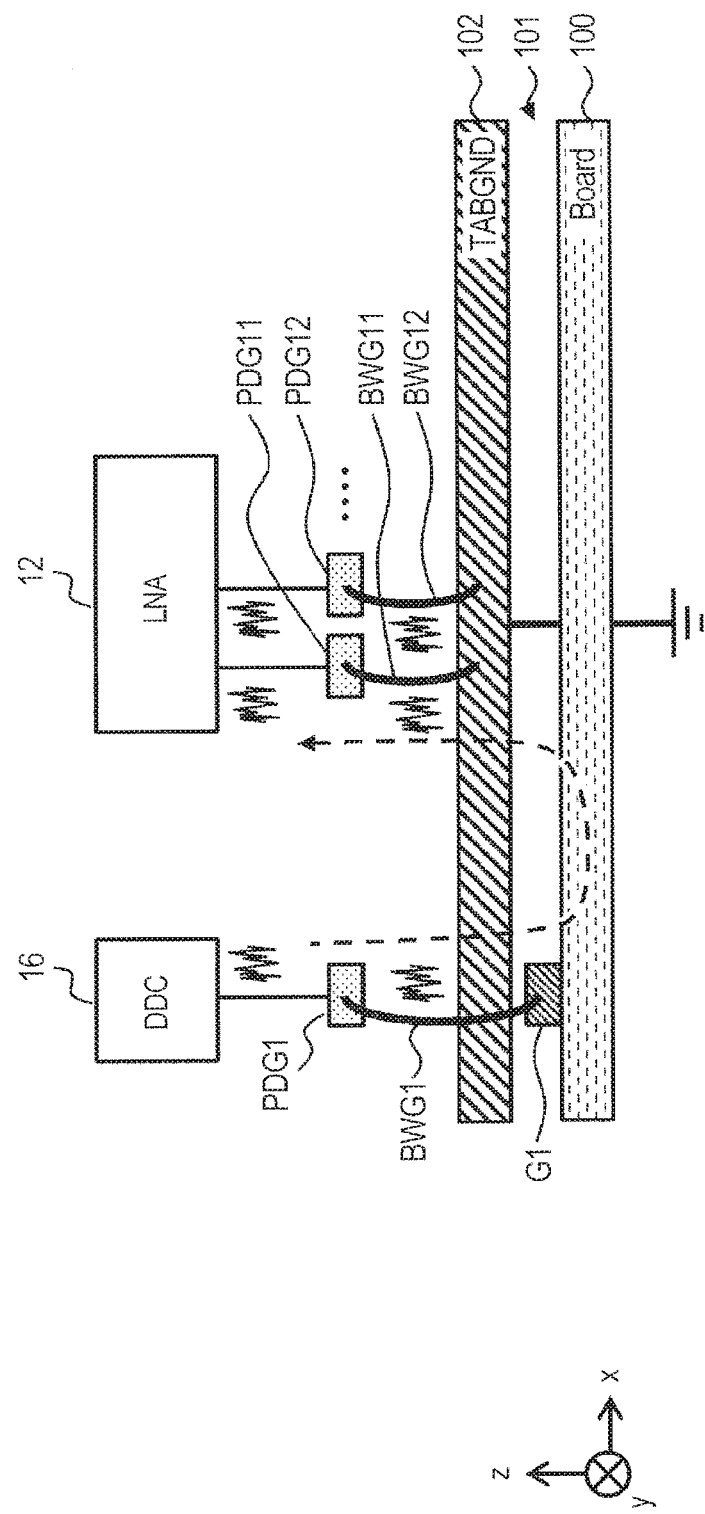
FIG. 11 is a schematic cross-sectional view showing the propagation of the noise from the DC-DC converter to the low noise amplifier in the wireless communication system shown in FIG. 9.
Figure 12:
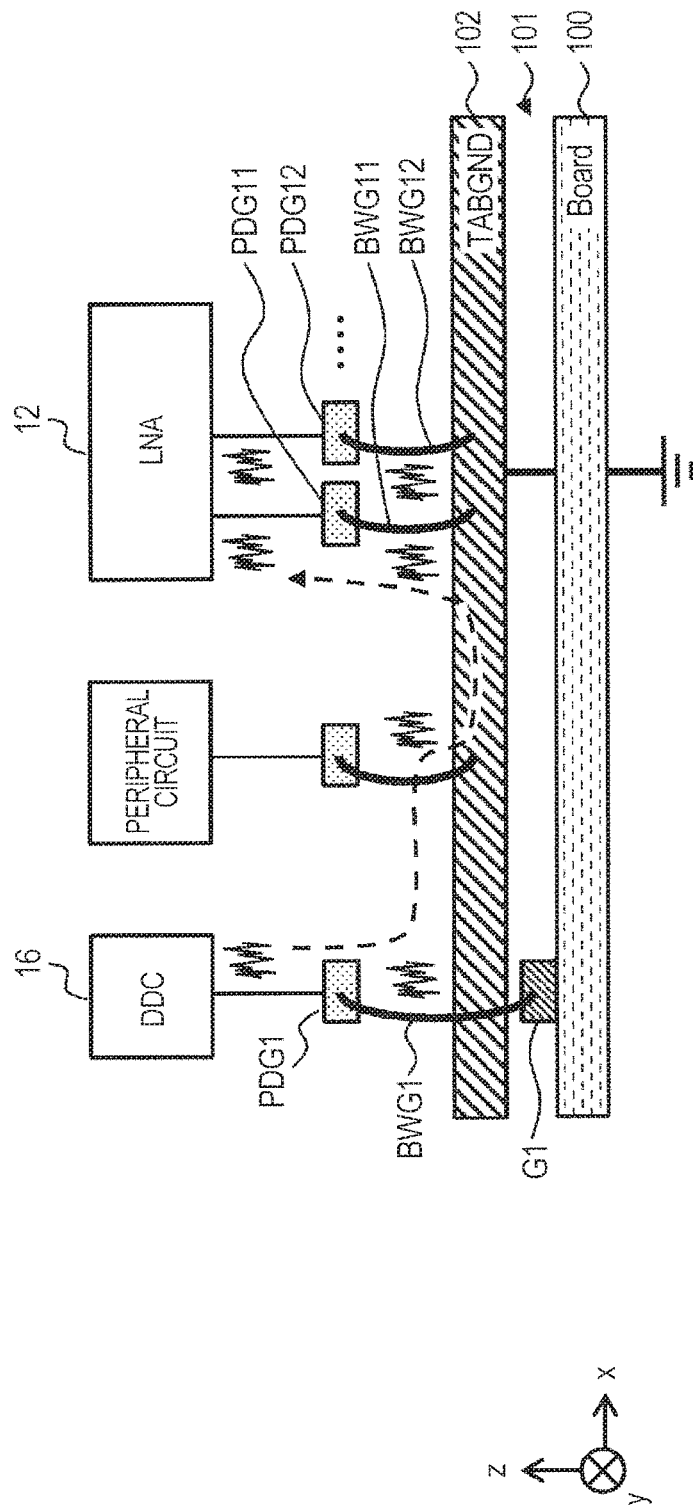
FIG. 12 is a schematic cross-sectional view showing the propagation of the noise from the DC-DC converter to the low noise amplifier in the wireless communication system shown in FIG. 9.

FIGS. 10 to 12 are schematic cross-sectional views showing the propagation of noise from the DC-DC converter 16 to the low noise amplifier 12 in the wireless communication system SYS50.

First, referring to FIG. 10, the harmonic component (noise), which is generated due to the switching operation of the DC-DC converter 16, is propagated from the voltage terminal on the low potential side of the DC-DC converter 16 to the bonding wire BWG1 through the pad PDG1. The noise is propagated to a bonding wire BWG11 (or BWG12, BWG13) that is electromagnetically coupled to the bonding wire BWG1. Then, the noise is propagated to the voltage terminal on the low potential side of the low noise amplifier 12 through the pad PDG11 (or PDG12, PDG13).

Further, referring to FIG. 11, the harmonic component (noise), which is generated due to the switching operation of the DC-DC converter 16, is propagated from the voltage terminal on the low potential side of the DC-DC converter 16 to the board 100, through the pad PDG1, the bonding wire BWG1, and the external connection terminal G1 of the semiconductor package 101. The noise is further propagated to the voltage terminal on the low potential side of the low noise amplifier 12, through the tab ground 102, the bonding wire BWG11 (or BWG12, BWG13), and the pad PDG11 (or PDG12, PDG13).

Still further, referring to FIG. 12, the harmonic component (noise), which is generated due to the switching operation of the DC-DC converter 16, is propagated from the voltage terminal on the low potential side of the DC-DC converter 16 to the bonding wire BWG1 through the pad PDG1. The noise is propagated to a bonding wire of a peripheral circuit electromagnetically coupled to the bonding wire BWG1. Then, the noise is propagated to the voltage terminal on the low potential side of the low noise amplifier 12 through the bonding wire BWG11 (or BWG12, BWG13) as well as the pad PDG11 (or PDG12, PDG13).

In other words, the harmonic component (noise), which is generated due to the switching operation of the DC-DC converter 16, is propagated to the low noise amplifier 12 through the path through which the ground voltage supplied to the DC-DC converter 16 is propagated, and through the path through which the ground voltage supplied to the low noise amplifier 12 is propagated.

Figure 13:
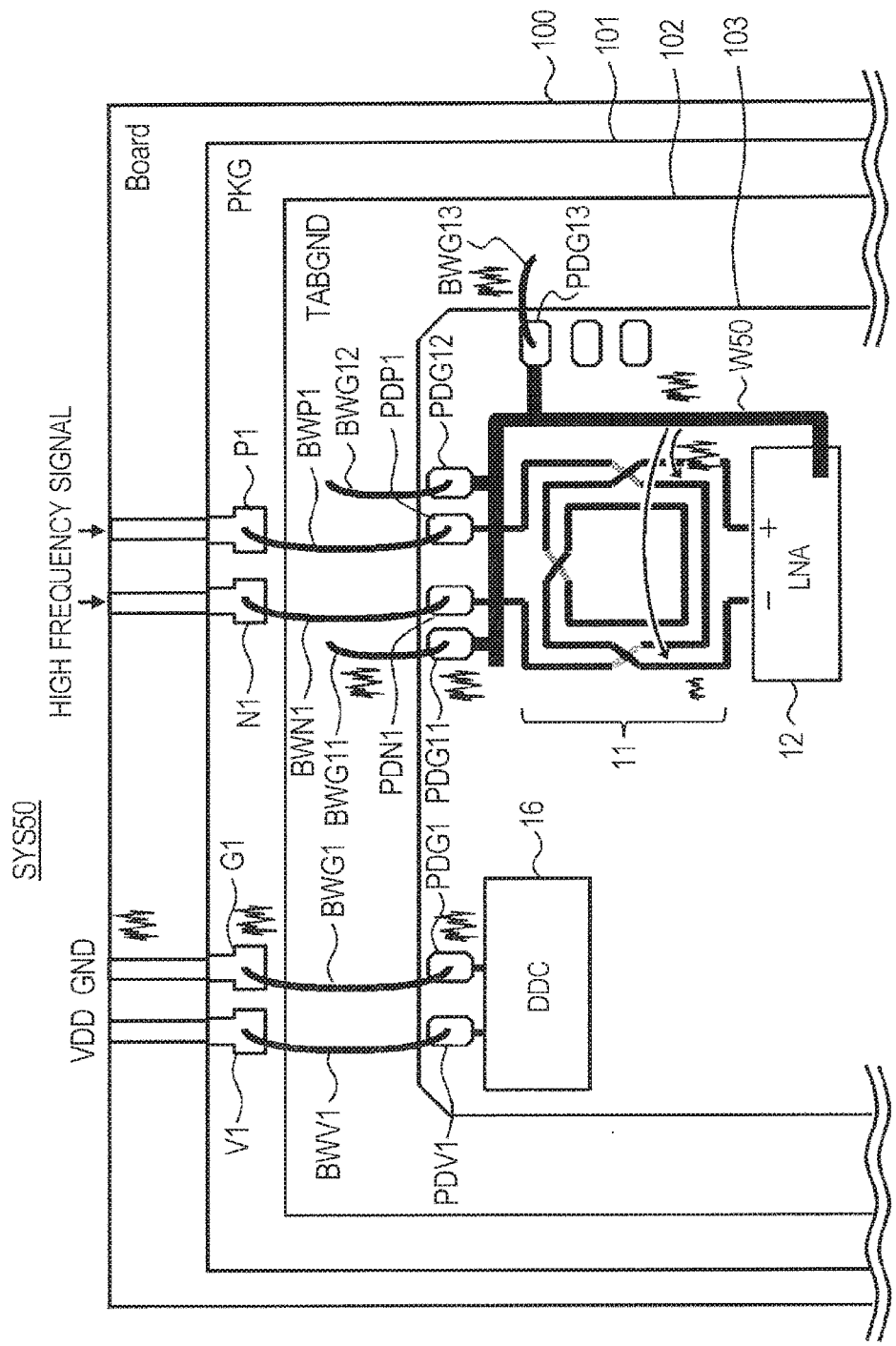
FIG. 13 is a schematic plan view showing the propagation of the noise from the DC-DC converter to the balun in the wireless communication system shown in FIG. 9.

FIG. 13 is a schematic plan view showing the propagation of the noise from the DC-DC converter 16 to the balun 11 in the wireless communication system SYS50.

As shown in FIG. 13, of the wiring paths from the low noise amplifier 12 to the pads PDG11 to PDG13 around the balun 11, the ground voltage line W50 is located in a first path (a path on the side closer to the outer periphery of the chip) passing through one side of the balun 11. However, the ground voltage line W50 is not located in a second path (a path on the side farther from the outer periphery of the chip) passing through the other side of the balun 11.

Thus, the electromagnetic coupling strength between the ground voltage line W50 and the positive side (one end side of each of the coils L11 and L12) of the balun 11 is greater than the electromagnetic coupling strength between the ground voltage line W50 and the negative side (the other end side of each of the coils L11 and L12) of the balun 11. As a result, the difference between the magnitude of the noise received at one output terminal of the balun 11 (namely, one end side of the coil L12) from the DC-DC converter 16 and the magnitude of the noise received at the other output terminal of the balun 11 (namely, the other end side of the coil L12) may increase to exceed the allowable range. In this case, the noise from the DC-DC converter is not sufficiently reduced by the compensation of the in-phase component using the balun 11. As a result, there is a problem that the reception sensitivity of the high frequency signal is degraded at a specific frequency (which is an integral multiple of the switching frequency).

Thus, the wireless communication system SYS1 according to the first embodiment was conceived that can prevent the degradation of the high frequency signal at a specific frequency by devising the arrangement of the ground voltage line that couples the low noise amplifier 12 to the ground voltage source GND to make the magnitudes of the noises received at one output terminal and the other output terminal of the balun 11 from the DC-DC converter approximately equal to each other.

(Planar Structure of the Wireless Communication System SYS1 According to the First Embodiment)

FIG. 2 is a schematic plan view of the wireless communication system SYS1 according to the first embodiment.

As shown in FIG. 2, in the wireless communication system SYS1, the semiconductor package 101 (corresponding to the wireless communication device) is formed on the board 100. The tab ground 102, which is the common ground voltage area, is formed within the semiconductor package 101. Then, the semiconductor chip 103 is formed on the tab ground 102. Note that the tab ground 102 is coupled to the ground voltage source GND through the board 100.

A plurality of functional blocks and a plurality of pads are arranged on the semiconductor chip 103. In the example of FIG. 2, of the functional blocks, only the balun 11, the low noise amplifier 12, and the DC-DC converter 16 are shown, and similarly of the pads, only the pads PDV1, PDG1, PDG 11 to PDG13, PDP1, and PDN1 are shown.

The plurality of the pads are arranged along the outer periphery on the semiconductor chip 103. The balun 11 is provided as close to the outer periphery as possible on the semiconductor chip 103. This configuration allows the balun 11 to receive the high frequency signal from outside with a high sensitivity.

The balun 11 is configured with the primary coil L11 and the secondary coil L12 as described above. In the example of FIG. 2, the primary coil L11 and the secondary coil L12 are arranged in a whorl-like pattern in such a way that their outer periphery is rectangular in the same wiring layer (however, in different wiring layers at the intersection). Further, in the example of FIG. 2, the primary coil L11 and the secondary coil L12 are arranged symmetrically with respect to the X-X' axis.

One end of the primary coil L11 is coupled to the pad PDP1, and the other end of the primary coil L11 is coupled to the pad PND1. The pad PDP1 is coupled to the external connection terminal P1 of the semiconductor package 101 through the bonding wire BWP1. The external connection terminal P1 is coupled to the antenna A1 through the board 100. The pad PDN1 is coupled to the external connection terminal N1 of the semiconductor package 101 through the bonding wire BWN1. Then, the external connection terminal N1 is coupled to the ground voltage source GND through the board 100.

One end of the secondary coil L12 is coupled to the non-inverting input terminal (P-side terminal) of the low noise amplifier 12, and the other end of the secondary coil L12 is coupled to the inverting input terminal (N-side terminal) of the low noise amplifier 12.

Further, the ground voltage line W1 is provided on the semiconductor chip 103 to couple the low noise amplifier 12 and the ground voltage source GND. More specifically, the ground voltage line W1 is arranged to extend from the voltage terminal on the low potential side of the low noise amplifier 12 towards the pads PDG11 to PDG13 around the balun 11.

The pads PDG11 to PDG13 are coupled to the tab ground 102 which is the common ground voltage area within the semiconductor package 101, respectively, through the bonding wires BWG11 to BWG13.

The voltage terminal on the high potential side of the DC-DC converter 16 is coupled to the pad PDV1, and the voltage terminal on the low potential side of the DC-DC converter 16 is coupled to the pad PDG1. The pad PDV1 is coupled to the external connection terminal V1 of the semiconductor package 101 through the bonding wire BWV1. The external connection terminal V1 is coupled to the power supply voltage source VDD through the board 100. The pad PDG1 is coupled to the external connection terminal G1 of the semiconductor package 101 through the bonding wire BWG1. Then, the external connection terminal G1 is coupled to the ground voltage source GND through the board 100.

Here, of the wiring paths from the low noise amplifier 12 to the pads PDG11 to PDG13 around the balun 11, the ground voltage line W1 is located in a first path (the path on the side closer to the outer periphery of the chip) passing through one side of the balun 11. At the same time, the ground voltage line W1 is also branched into a second path (a path on the side farther from the outer periphery of the chip) passing through the other side of the balun 11.

Hereinafter, the ground voltage line W1 provided in the first path passing through one side of the balun 11 will be referred to as a partial ground voltage line W11, and the ground voltage line W1 provided in the second path passing through the other side of the balun 11 will be referred to as a partial ground voltage line W12. At this time, the partial voltage lines W11 and W12 are arranged to face each other with the balun interposed therebetween.

In other words, the ground voltage line W1 including the partial ground voltage lines W11 and W12, as well as the low noise amplifier 12 are provided to surround the balun 11. Note that a joint part Q1 of the ground voltage line W1 in which the ground voltages supplied through the pads PDG11 to PDG13 are gathered is located outside the line part of the ground voltage line W1 surrounding the balun 11. At the same time, the joint part Q1 is located on the symmetry axis (on the X-X' axis) of the balun 11.

With this configuration, the difference between the noise received at one output terminal (one end of the secondary coil L12) of the balun 11 and the noise received at the other output terminal (the other end of the secondary coil L12) of the balun 11 is reduced to a value within a predetermined allowable range (ideally, reduced to the extent that there is virtually no difference). Thus, the noise from the DC-DC converter 16 is sufficiently reduced by the compensation of the in-phase component using the balun 11. As a result, the wireless communication system SYS1 can prevent the degradation of the reception sensitivity of the high frequency signal at a specific frequency (which is an integral multiple of the switching frequency).

Figure 3:
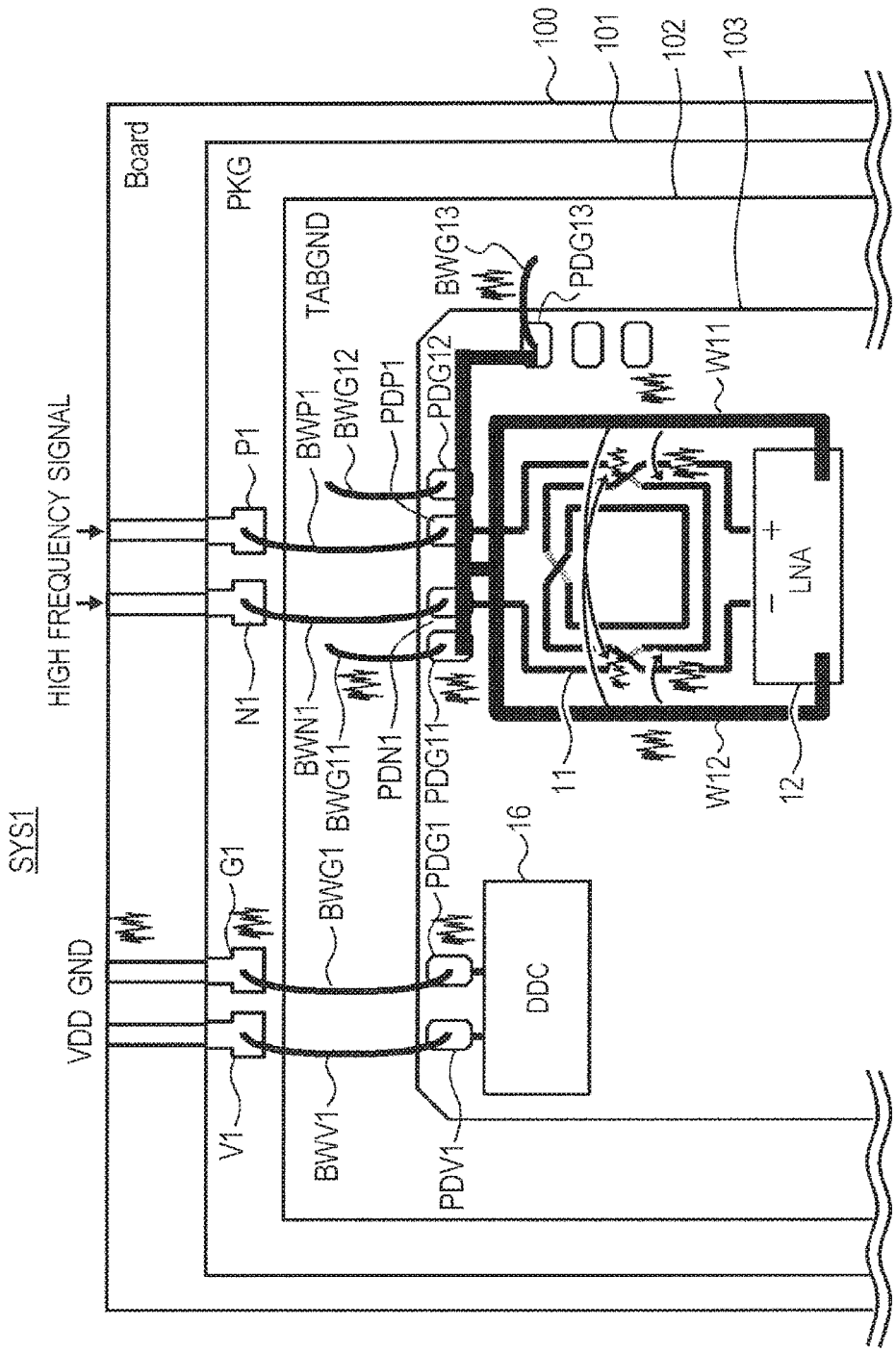
FIG. 3 is a schematic plan view showing the propagation of noise from the DC-DC converter to the balun in the wireless communication system shown in FIG. 2.

FIG. 3 is a schematic plan view showing the propagation of the noise from the DC-DC converter 16 to the balun 11 in the wireless communication system SYS1.

As shown in FIG. 3, the partial ground voltage lines W11 and W12 are arranged to face each other with the balun 11 interposed therebetween. With this configuration, the electromagnetically coupling strength between each of the partial ground voltage lines W11, W12 and the positive side (the path on one end side of each of the coils L11 and L12) of the balun 11 and the electromagnetically coupling strength between each of the partial ground voltage lines W11, W12 and the negative side (the path on the other side of each of the coils L11 and L12) of the balun 11 are approximately equal to each other. In this way, the difference between the magnitude of the noise received at one output terminal of the balun 11 from the DC-DC converter 16 and the magnitude of the noise received at the other output terminal of the balun 11 from the DC-DC converter 16 is reduced to a value within a predetermined allowable range. Thus, the noise from the DC-DC converter 16 is sufficiently reduced by the compensation of the in-phase component using the balun 11. As a result, the wireless communication system SYS1 can prevent the degradation of the reception sensitivity of the high frequency signal at a specific frequency (which is an integral multiple of the switching frequency).

Note that it is desirable that the distance between the partial ground voltage line W11 and the balun 11 and the distance between the partial ground voltage line W12 and the balun 11 are substantially the same. More specifically, it is desirable that the distance between the partial ground voltage line W11 and the outer periphery of the coils L11 and L12 that configure the balun 11, and the distance between the partial ground voltage line W12 and the outer periphery of the coils L11 and L12 that configure the balun 11 are substantially the same. Here, the phrase "substantially the same" means including not only the case in which the two distances are completely equal to each other, but also the case in which the two distances deviate from the state of being completely equal by an error. In this way, the difference between the magnitude of the noise received at one output terminal of the balun 11 from the DC-DC converter 16 and the magnitude of the noise received at the other output terminal of the balun 11 from the DC-DC converter 16 is further reduced. As a result, the degradation of the reception sensitivity of the high frequency signal is further reduced at a specific frequency of the wireless communication system SYS1.

Also it is desirable that the width of the partial ground voltage line W11 and the width of the partial ground voltage line W12 are substantially the same. Further, it is desirable that the partial ground voltage line W11 and the partial ground voltage line W12 are arranged symmetrically with respect to the balun 11 (with the X-X' axis as the symmetry axis). In this way, the difference between the magnitude of the noise received at one output terminal of the balun 11 from the DC-DC converter 16 and the magnitude of the noise received at the other output terminal of the balun 11 from the DC-DC converter 16 is further reduced. As a result, the degradation of the reception sensitivity of the high frequency signal is further reduced at a specific frequency of the wireless communication system SYS1.

As described above, in the wireless communication system SYS1, not only the balun 11 and the low noise amplifier 12 but also the DC-DC converter 16 is mounted on the semiconductor chip 103 forming the wireless communication system 1. Further, the ground voltage line W1 that couples the low noise amplifier 12 to the ground voltage source GND is branched into the partial ground voltage lines W11 and W12. Then, the partial ground voltage lines W11 and W12 are arranged to face each other with the balun 11 interposed therebetween. With this configuration, the wireless communication system SYS1 can make the magnitudes of the noises, which are received at one output terminal and the other output terminal of the balun 11 from the DC-DC converter 16, approximately equal to each other, thereby reducing the degradation of the reception sensitivity of the high frequency signal at a specific frequency.

(Variation of the Wireless Communication System SYS1)

Figure 4:
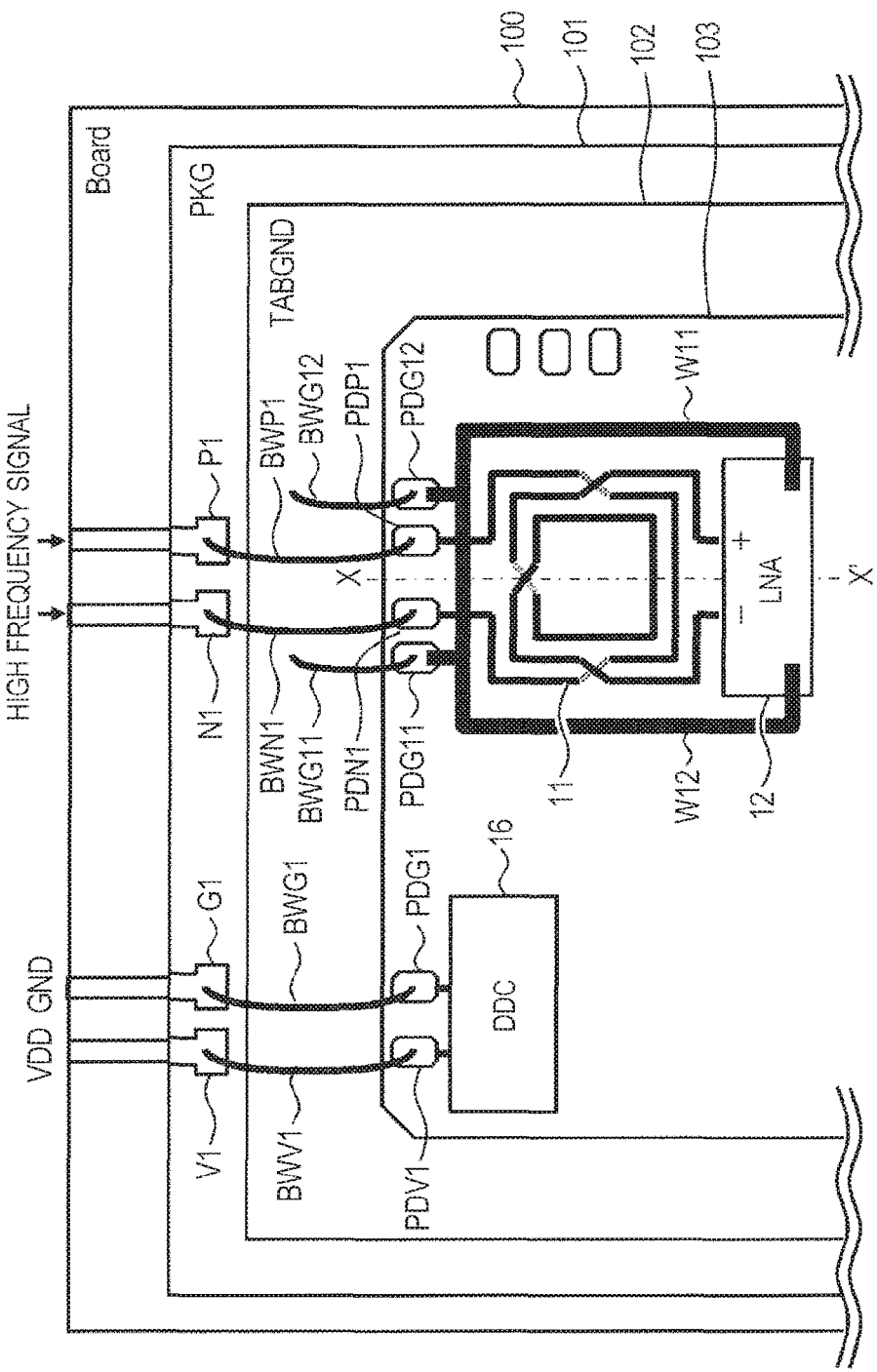
FIG. 4 is a schematic plan view showing a variation of the wireless communication system shown in FIG. 2.

FIG. 4 is a schematic plan view showing a variation of the wireless communication system SYS1 as a wireless communication system SYS1a. The wireless communication system SYS1a is different in the wiring pattern of the ground voltage line W1 compared with the case of the wireless communication system SYS1.

More specifically, the ground voltage line W1 is coupled to the pads PDG11 to PDG13 in the wireless communication system SYS1, but in the wireless communication system SYS1a, the ground voltage line W1 is coupled only to the pads PDG11 and PDG12. With this configuration, the wireless communication system SYS1a can improve the symmetry of the wiring pattern of the ground voltage line W1. In this way, the difference between the magnitude of the noise received at one output terminal of the balun 11 from the DC-DC converter 16 and the magnitude of the noise received at the other output terminal of the balun 11 from the DC-DC converter 16 is further reduced. As a result, the degradation of the reception sensitivity of the high frequency signal is further reduced at a specific frequency.

Note that the wiring pattern of the ground voltage line W1 is not limited to that shown in FIG. 4, and can be appropriately changed into a wiring pattern that can improve the symmetry.

Second Embodiment

Figure 5:
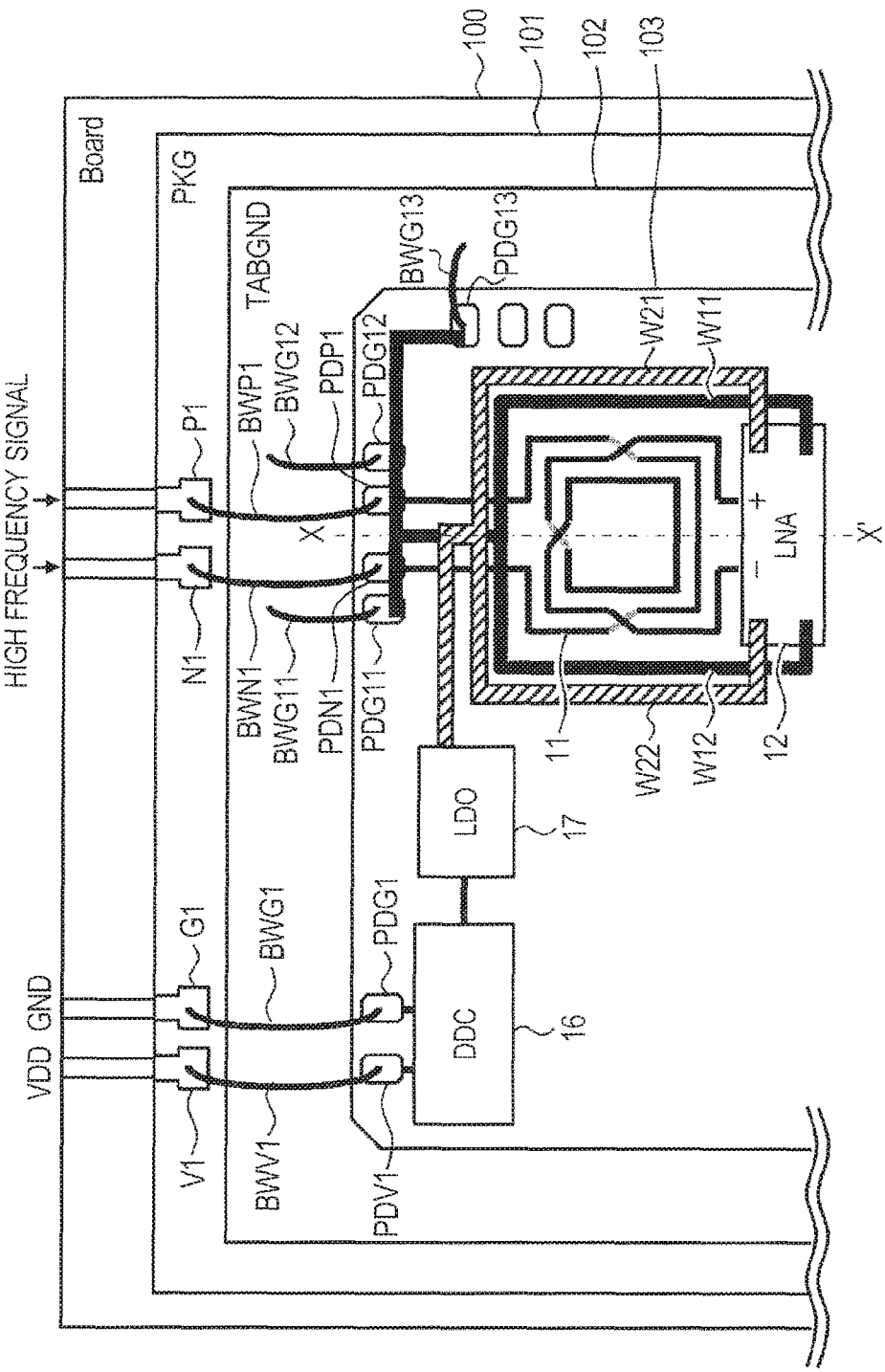
FIG. 5 is a schematic plan view of a wireless communication system according to a second embodiment.

FIG. 5 is a schematic plan view of a wireless communication system SYS1b according to a second embodiment.

As shown in FIG. 5, in the wireless communication system SYS1b, a power supply voltage line W2 through which the output voltage Vout of the DC-DC converter 16 is propagated from the DC-DC converter 16 to the low noise amplifier 12 is branched into partial power supply voltage lines W21 and W22. The partial power supply voltage lines W21 and W22 are arranged to face each other with the balun 11 interposed therebetween.

More specifically, of the wiring paths from the DC-DC converter 16 to the low noise amplifier 12 around the balun 11, the power supply voltage line W2 is located in a first path (a path on the side closer to the outer periphery of the chip) passing through one side of the balun 11. At the same time, the power supply voltage line W2 is also branched into a second path (a path on the side farther from the outer periphery of the chip) passing through the other side of the balun 11.

Hereinafter, the power supply voltage line W2 located in the first path passing through one side of the balun 11 will be referred to as the partial power supply voltage line W21, and the second power supply voltage line W2 located in the second path passing through the other side of the balun 11 will be referred to as the partial power supply voltage line W22. At this time, the partial power supply voltage lines W21 and W22 are arranged to face each other with the balun 11 interposed therebetween.

In this way, the difference between the noise received at one output terminal of the balun 11 from the DC-DC converter 16 and the noise received at the other output terminal of the balun 11 from the DC-DC converter 16 is reduced to a value within a predetermined allowable range (ideally, reduced to the extent that there is virtually no difference). Thus, the noise from the DC-DC converter 16 is sufficiently reduced by the compensation of the in-phase component using the balun 11. As a result, the wireless communication system SYS1 can prevent the degradation of the reception sensitivity of the high frequency signal at a specific frequency (which is an integral multiple of the switching frequency).

Note that it is desirable that the distance between the partial power supply voltage line W21 and the balun 11 and the distance between the partial power supply voltage line W22 and the balun 11 are substantially the same. More specifically, it is desirable that the distance between the partial power supply voltage line W21 and the outer periphery of the coils L11 and L12 that configure the balun 11, and the distance between the partial power supply voltage line W22 and the outer periphery of the coils L11 and L12 that configure the balun 11 are substantially the same. Here, the phrase "substantially the same" means not only the case in which the two distances are completely equal to each other, but also the case in which the two distances deviate from the state of being completely equal by an error. With this configuration, the magnitude of the noise received at one output terminal of the balun 11 from the DC-DC converter 16 and the magnitude of the noise received at the other output terminal of the balun 11 from the DC-DC converter 16 is further reduced. As a result, the degradation of the reception sensitivity of the high frequency signal is further reduced at a specific frequency of the wireless communication system SYS1b.

Also it is desirable that the width of the partial power supply voltage line W21 and the width of the partial power supply voltage line W22 are substantially the same. In addition, it is desirable that the partial power supply voltage line W21 and the partial power supply voltage line W22 are arranged symmetrically with respect to the balun 11 (with the X-X' axis as the symmetry axis). In this way, the difference between the magnitude of the noise received at one output terminal of the balun 11 from the DC-DC converter 16 and the magnitude of the noise received at the other output terminal of the balun 11 from the DC-DC converter 16 is further reduced. As a result, the degradation of the reception sensitivity of the high frequency signal is further reduced at a specific frequency of the wireless communication system SYS1b.

Third Embodiment

Figure 6:
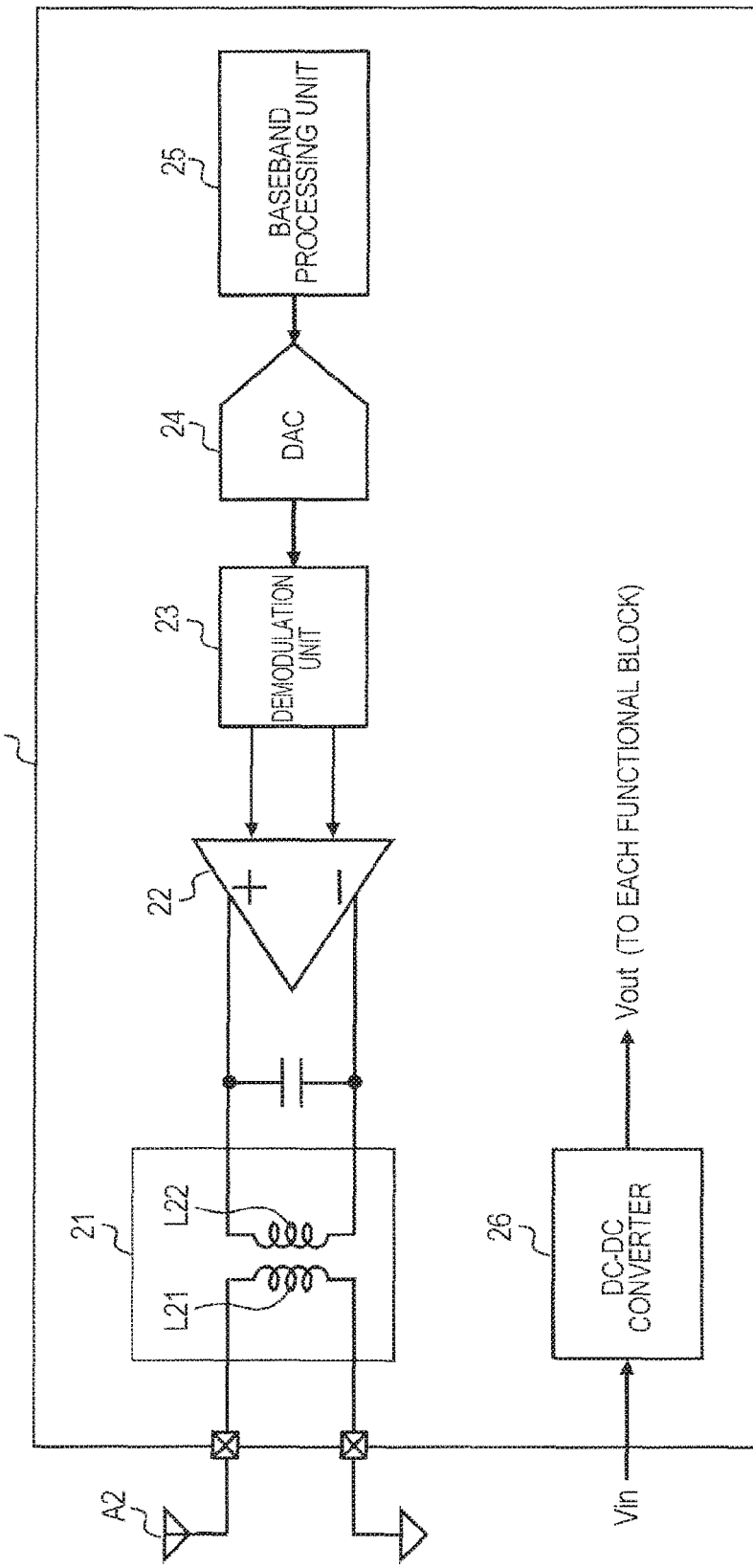
FIG. 6 is a block diagram showing a configuration example of a wireless communication system according to a third embodiment.

FIG. 6 is a block diagram showing a configuration example of a wireless communication system SYS2 according to a third embodiment. Although the circuit of the reception path is mainly shown in the wireless communication system SYS1, the circuit of the transmission path is mainly shown in the wireless communication system SYS2. A detailed description is given below.

As shown in FIG. 6, the wireless communication system SYS2 includes at least a wireless communication device (semiconductor device) 2 and an antenna A2. For example, the wireless communication device 2 is formed on a single semiconductor chip, including a balun 21, a power amplifier (internal circuit) 22, a demodulation unit 23, a DA converter 24, and a baseband processing unit 25. Note that in the example of FIG. 6, the circuit of the transmission path is shown in the wireless communication device 2 but, of course, the circuit of the reception path can be provided in the wireless communication device 2.

The baseband processing unit 25 generates a baseband signal based on the data received from the upper device not shown. The DA converter 24 converts the digital baseband signal into an analog baseband signal. The demodulation unit 23 demodulates the analog baseband signal output from the DA converter 24 into a differential high frequency signal. The power amplifier 22 amplifies the differential high frequency signal output from the demodulation unit 23, to a level sufficient for wireless transmission.

For example, the balun 21 converts the differential high frequency signal output from the power amplifier 22 into a single-ended high frequency signal. Note that the balun 21 not only converts the single-ended high frequency signal into a differential high frequency signal, but also outputs a differential high frequency signal by transmitting the differential high frequency signal in some cases. Hereinafter, only the former case will be described as a representative example.

More specifically, the balun 21 is configured with a primary coil L22 and a secondary coil L21. One end of the primary coil L22 is coupled to a non-inverting output terminal (P-side terminal) of the power amplifier 22, and the other end of the primary coil L22 is coupled to an inverting output terminal (N-side terminal) of the power amplifier 22. One end of the secondary coil L21 is coupled to the antenna A2 and the other end of the secondary coil L21 is coupled to the ground voltage terminal GND.

For example, when the wirelessly transmitted high frequency signal has a positive amplitude, the current flows from one end to the other end of the primary coil L22. Then, a positive electromotive force is generated in the secondary coil L12 according to the current change in the primary coil L22. On the other hand, when the wirelessly transmitted high frequency signal is a negative amplitude, the current flows from the other end to one end of the primary coil L22. Then, a negative electromotive force is generated in the primary coil L21 according to the current change in the primary coil L22. As a result, a negative amplitude AC signal is generated at one end of the secondary coil L21. In other words, a single-ended high frequency signal is output from one end of the secondary coil L21.

Note that the configuration of the balun 21 is not limited to the configuration described above, but can be appropriately applied to any other configurations with an equivalent function. For example, in addition to performing the conversion between balance and imbalance of electrical signals, the balun 21 may have a function as a matching circuit that performs impedance matching.

The single-ended high frequency signal output from the balun 21 is wirelessly transmitted to the outside through the antenna A2.

The DC-DC converter 26 corresponds to the DA converter 16 and has a switching circuit configuration. The DC-DC converter 26 performs a switching operation synchronously with a clock signal CLK (not shown) to generate an output voltage Vout by stepping up or down an input voltage Vin that is supplied from a power source (not shown). The output voltage Vout is supplied to the respective functional blocks (the power amplifier 22, the demodulation unit 23, the DA converter 24, the baseband processing unit 25, and the like) that are provided in the wireless communication device 2.

In this way, the wireless communication system SYS2 drives each functional block by using the output voltage Vout from the DC-DC converter 26, thus causing current to be intermittently supplied from the power source. As a result, the increase in power consumption can be suppressed.

Next, the planar structure of the wireless communication system SYS2 is described.

(Planer Structure of the Wireless Communication System SYS2 According to the Third Embodiment)

Figure 7:
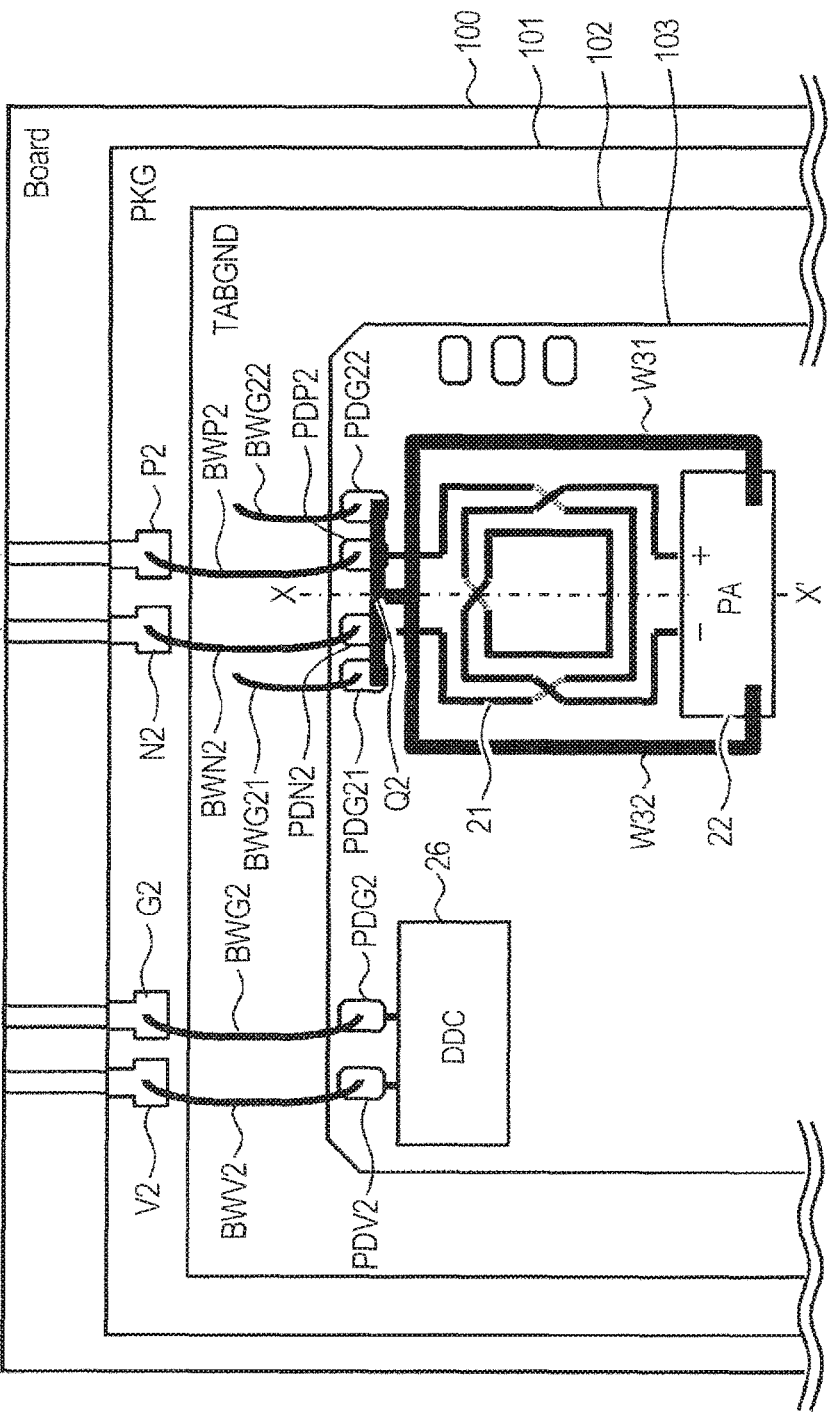
FIG. 7 is a schematic plan view of the wireless communication system shown in FIG. 6.

FIG. 7 is a schematic plan view of the wireless communication system SYS2 according to the third embodiment.

As shown in FIG. 7, in the wireless communication system SYS2, the semiconductor package 101 (corresponding to the wireless communication device) is formed on the board 100. The tab ground 102, which is the common ground voltage area, is formed within the semiconductor package 101. Then, the semiconductor chip 103 is formed on the tab ground 102. Note that the tab ground 102 is coupled to the ground voltage source GND through the board 100.

A plurality of functional blocks and a plurality of pads are arranged on the semiconductor chip 103. In the example of FIG. 7, of the functional blocks, only the balun 21, the low noise amplifier 22, the demodulation unit 23, the DA converter 24, the baseband processing unit 25, and the DC-DC converter 26 are shown, and similarly of the pads, only pads PDV2, PDG2, PDG 21 to PDG22, PDP2, and PDN2 are shown.

The pads are arranged along the outer periphery on the semiconductor chip 103. The balun 21 is provided as close to the outer periphery as possible on the semiconductor chip 103. In this way, the balun 21 can wirelessly transmit the high frequency signal with a high sensitivity.

As described above, the balun 21 is configured with the primary coil L22 and the secondary coil L21. In the example of FIG. 7, the primary coil L22 and the secondary coil L21 are arranged in a whorl-like pattern in such a way that their outer periphery is rectangular in the same wiring layer (however, in different wiring layers at the intersection). Further, in the example of FIG. 7, the primary coil L22 and the secondary coil L21 are arranged symmetrically with respect to the X-X' axis as the symmetry axis.

One end of the secondary coil L21 is coupled to the pad PDP2 and the other end of the secondary coil L21 is coupled to the pad PDN2. The pad PDP2 is coupled to an external connection terminal P2 of the semiconductor package 101 through a bonding wire BWP2. The external connection terminal P2 is coupled to the antenna A2 through the board 100. The pad PDN2 is coupled to an external connection terminal N2 of the semiconductor package 101 through the bonding wire BWN2. Then, the external connection terminal N2 is coupled to the ground voltage source GDN through the board 100.

One end of the primary coil L22 is coupled to the non-inverting output terminal (P-side terminal) of the power amplifier 22. Then, the other end of the primary coil L22 is coupled to the inverting output terminal (N-side terminal) of the power amplifier 22.

Further, a ground voltage line W3 is provided on the semiconductor chip 103 to couple the power amplifier 22 and the ground voltage source GND. More specifically, the ground voltage line W3 is arranged to extend from the voltage terminal on the low potential side of the power amplifier 22 towards the pads PDG21 to PDG22 around the balun 21.

The pads PDG21 to PDG22 are coupled to the tab ground 102, which is the common ground voltage area within the semiconductor package 101, respectively, through the bonding wires BWG21 to BWG22.

The voltage terminal on the high potential side of the DC-DC converter 26 is coupled to the pad PDV2. Further, the voltage terminal on the low potential side of the DC-DC converter 26 is coupled to the pad PDG2. The pad PDV2 is coupled to an external connection terminal V2 of the semiconductor package 101 through a bonding wire BWV2. The external connection terminal is coupled to the power supply voltage source VDD through the board 100. The pad PDG2 is coupled to an external connection terminal G2 of the semiconductor package 101 through the bonding wire BWG2. Then, the external connection terminal G2 is coupled to the ground voltage source GND through the board 100.

Here, of the wiring paths from the power amplifier 22 to the pads PDG21 to PDG22 around the balun 21, the ground voltage line W3 is located in a first path (a path on the side closer to the outer periphery of the chip) passing through one side of the balun 21. At the same time, the ground voltage line W3 is also branched into a second path (a path on the side farther from the outer periphery of the chip) passing through the other side of the balun 21.

Hereinafter, the ground voltage line W3 located in the first path passing through one side of the balun 21 will be referred to as a partial ground voltage line W31, and the ground voltage line W3 located in the second path passing through the other side of the balun 21 will be referred to as a partial ground voltage line W32. At this time, the partial voltage lines W31 and W32 are arranged to face each other with the balun interposed therebetween.

In other words, the ground voltage line W3 including the partial ground voltage lines W31, W32 as well as the power amplifier 22 are provided to surround the balun 21. Here, a joint part Q2 of the ground voltage line W3 in which ground voltages supplied through the pads PDG21 to PDG22 are gathered is located outside the line part of the ground voltage line W3 surrounding the balun 21. At the same time, the joint part Q2 is located on the symmetry axis (on the X-X' axis) of the balun 21.

With this configuration, the difference between the noise received at one output terminal (one end of the secondary coil L21) of the balun 21 from the DC-DC converter 26 and the noise received at the other terminal (the other end of the secondary coil L21) of the balun 21 from the DC-DC converter 26 is reduced to a value within a predetermined allowable range (ideally, reduced to the extent that there is virtually no difference). Thus, the wireless communication system SYS2 can prevent the degradation of the reception sensitivity of the high frequency signal at a specific frequency (which is an integral multiple of the switching frequency).

FIG. 8 is a schematic plan view showing the propagation of the noise from the DC-DC converter 26 to the balun 21 in the wireless communication system SYS2.

As shown in FIG. 8, the partial ground voltage lines W31 and W32 are arranged to face each other with the balun 21 interposed therebetween. With this configuration, the electromagnetically coupling strength between each of the partial ground voltage lines W31, W32 and the positive side (the path on one end side of each of the coils L21 and L22) of the balun 21 and the electromagnetically coupling strength between each of the partial ground voltage lines W31, W32 and the negative side (the path on the other side of each of the coils L21 and L22) of the balun 21 are approximately equal to each other. In this way, the difference between the magnitude of the noise received at one output terminal of the balun 21 from the DC-DC converter 26 and the magnitude of the noise received at the other output terminal of the balun 21 from the DC-DC converter 26 is reduced to a value within a predetermined allowable range. Thus, the noise from the DC-DC converter 26 is sufficiently reduced by the compensation of the in-phase component using the balun 21. As a result, the wireless communication system SYS2 can prevent the degradation of the reception sensitivity of the high frequency signal at a specific frequency (which is an integral multiple of the switching frequency).

Note that it is desirable that the distance between the partial ground voltage line W31 and the balun 21 and the distance between the partial ground voltage line W32 and the balun 21 are substantially the same. More specifically, it is desirable that the distance between the partial ground voltage line W31 and the outer periphery of the coils L21 and L22 that configure the balun 21, and the distance between the partial ground voltage line W32 and the outer periphery of the coils L21 and L22 that configure the balun 21 are substantially the same. Here, the phrase "substantially the same" means including not only the case in which the two distances are completely equal to each other, but also the case in which the two distances deviate from the state of being completely equal by an error. With this configuration, the difference between the magnitude of the noise received at one output terminal of the balun 21 from the DC-DC converter 21 and the magnitude of the noise received at the other output terminal of the balun 21 from the DC-DC converter 21 is further reduced. Thus, the degradation of the reception sensitivity of the high frequency signal is further reduced at a specific frequency of the wireless communication system SYS2.

Also it is desirable that the width of the partial ground voltage line W31 and the wide of the partial ground voltage line W32 are substantially the same. In addition, it is desirable that the partial ground voltage line W31 and the partial ground voltage line W32 are arranged symmetrically with respect to the balun 21 (with the X-X' axis as the symmetry axis). In this way, the difference between the magnitude of the noise received at one output terminal of the balun 21 from the DC-DC converter 26 and the magnitude of the noise received at the other output terminal of the balun 21 from the DC-DC converter 26 is further reduced. Thus, the degradation of the reception sensitivity of the high frequency signal is further reduced at a specific frequency of the wireless communication system SYS2.

As described above, in the wireless communication system SYS2, not only the balun 21 and the power amplifier 22 but also the DC-DC converter 26 is mounted on the semiconductor chip 103 forming the wireless communication device 2. Further, the ground voltage line W3 that couples the power amplifier 22 to the ground voltage source GND is branched into the partial ground voltage lines W31 and W32. Then, the partial ground voltage lines W31 and W32 are arranged to face each other with the balun 21 interposed therebetween. With this configuration, the wireless communication system SYS2 can make the magnitudes of the noises received at one output terminal and the other output terminal of the balun 11 from the DC-DC converter 16 approximately equal to each other, thereby reducing the degradation of the reception sensitivity of the high frequency signal at a specific frequency.

As described above, in each wireless communication system according to the first to third embodiments, not only the balun and the amplifier (the low noise amplifier, the power amplifier, or the like) but also the DC-DC converter is mounted on the semiconductor chip forming the wireless communication system. Further, the ground voltage line that couples the amplifier to the ground voltage source is branched into two partial ground voltage lines. Then, the partial ground voltage lines are arranged to face each other with the balun interposed therebetween. With this configuration, each wireless communication system according to the first to third embodiments can make the magnitudes of the noises, which are received at one output terminal and the other output terminal of the balun from the DC-DC converter, approximately equal to each other, thereby reducing the degradation of the reception sensitivity of the high frequency signal at a specific frequency.

The invention made by the present inventors has been specifically described based on the embodiments. However, it is needless to say that the present invention is not limited to the foregoing embodiments and various modifications and alterations can be made within the scope not departing from the gist of the present invention.

For example, in each semiconductor device according to the exemplary embodiments, the conductivity type (P type or N type) of the semiconductor substrate, the semiconductor layer, the diffusion layer (diffusion area) or other layers can be reversed. Thus, if it is assumed that one conductivity type, either N type or P type, is a first conductivity and the other conductivity type is a second conductivity, it is possible to define the first conductivity type as P type and the second conductivity type as N type or, inversely, define the first conductivity type as N type and the second conductivity type as P type.

What is claimed is:

1. A wireless communication device comprising:
   a switching-type DC-DC converter;
   a balun configured with a coil to output a differential signal based on a wirelessly received high frequency signal;
   an internal circuit driven by an output voltage of the DC-DC converter to process the differential signal output from the balun; and
   a ground voltage line that couples the internal circuit to a ground voltage source,
   wherein the ground voltage line comprises:
   a first partial ground voltage line, and
   a second partial ground voltage line arranged to face the first partial ground voltage line with the balun interposed therebetween.

2. The wireless communication device according to claim 1,
wherein the first and second partial ground voltage lines are arranged in such a way that the difference between the noise received at one output terminal of the balm from the DC-DC converter and the noise received at the other output terminal of the balun from the DC-DC converter is within a predetermined allowable range.

3. The wireless communication device according to claim 1,
wherein the first and second partial ground voltage lines are arranged in such a way that there is virtually no difference between the noise received at one output terminal of the balun from the DC-DC converter and the noise received at the other output terminal of the balun from the DC-DC converter.

4. The wireless communication device according to claim 1,
wherein the distance between the first partial ground voltage line and the outer periphery of the coil configuring the balun and the distance between the second partial ground voltage line and the outer periphery of the coil configuring the balun are substantially the same.

5. The wireless communication device according to claim 1,
wherein the width of the first partial ground voltage line and the width of the second partial ground voltage line are substantially the same.

6. The wireless communication device according to claim 1,
wherein the first partial ground voltage line and the second partial ground voltage line are arranged symmetrically with respect to the balun.

7. The wireless communication device according to claim 1, further comprising a power supply voltage line through which the output voltage of the DC-DC converter is propagated from the DC-DC converter to the internal circuit,
wherein the power supply voltage line comprises:
a first partial power supply voltage line, and
a second partial power supply voltage line arranged to face the first power supply voltage line with the balun interposed therebetween.

8. The wireless communication device according to claim 7,
wherein the first and second partial power supply voltage lines are arranged in such a way that the difference between the noise received at one output terminal of the balun from the DC-DC converter and the noise received at the other output terminal of the balun from the DC-DC converter is within a predetermined allowable range.

9. The wireless communication device according to claim 7,
wherein the first and second partial power supply voltage lines are arranged in such a way that there is virtually no difference between the noise received at one output terminal of the balun from the DC-DC converter and the noise received at the other output terminal of the balun from the DC-DC converter.

10. The wireless communication device according to claim 7,
wherein the distance between the first partial power supply voltage line and the outer periphery of the coil configuring the balun and the distance between the second power supply voltage line and the outer periphery of the coil configuring the balun are substantially the same.

11. The wireless communication device according to claim 7,
wherein the width of the first partial power supply voltage line and the width of the second partial power supply voltage line are substantially the same.

12. The wireless communication device according to claim 7,
wherein the first partial power supply voltage line and the second partial power supply voltage line are arranged symmetrically with respect to the balun.

13. The wireless communication device according to claim 1,
wherein the internal circuit is a low noise amplifier that amplifies the differential signal.

14. A wireless communication device comprising:
a switching-type DC-DC converter;
an internal circuit driven by an output voltage of the DC-DC converter to output a differential signal;
a balun configured with a coil to output a differential signal; and
a ground voltage line that couples the internal circuit to a ground voltage source,
wherein the ground voltage line comprises:
a first partial ground voltage line, and
a second partial ground voltage line arranged to face the first ground voltage line with the balun interposed therebetween.

15. The wireless communication device according to claim 14,
wherein the first and second partial ground voltage lines are arranged in such a way that the difference between the noise received at one output terminal of the balun from the DC-DC converter and the noise received at the other output terminal of the balun from the DC-DC converter is within a predetermined allowable range.

16. The wireless communication device according to claim 14,
wherein the first and second partial ground voltage lines are arranged in such a way that there is virtually no difference between the noise received at one output terminal of the balun from the DC-DC converter and the noise received at the other output terminal of the balun from the DC-DC converter.

17. The wireless communication device according to claim 14,
wherein the distance between the first partial ground voltage line and the outer periphery of the coil configuring the balun and the distance between the second partial ground voltage line and the outer periphery of the coil configuring the balun are substantially the same.

18. The wireless communication device according to claim 14,
wherein the width of the first partial ground voltage line and the width of the second partial ground voltage line are substantially the same.

19. The wireless communication device according to claim 14,
wherein the first partial ground voltage line and the second partial ground voltage line are arranged symmetrically with respect to the balun.

* * * * *